United States Patent [19]

Beauducel et al.

[11] Patent Number: 4,787,069
[45] Date of Patent: Nov. 22, 1988

[54] DEVICE USABLE FOR OFFSHORE SEISMIC PROSPECTION FOR RECEIVING SEISMIC SIGNALS AND TRANSMITTING THEM TO A CENTRAL CONTROL AND RECORDING SYSTEM

[75] Inventors: Claude Beauducel, Henonville; Pierre Fouquet, Argenteuil, both of France

[73] Assignee: Institut Francais du Petrole, Rueil-Malmaison, France

[21] Appl. No.: 934,917

[22] Filed: Nov. 25, 1986

[30] Foreign Application Priority Data

Nov. 25, 1985 [FR] France ............................... 85 17498

[51] Int. Cl.$^4$ ............................................... G01J 1/22
[52] U.S. Cl. .......................................... 367/21; 367/79
[58] Field of Search ....................... 367/20, 21, 76, 78, 367/79, 77, 129; 340/870.13; 370/112; 375/106, 107

[56] References Cited

U.S. PATENT DOCUMENTS

| | | | |
|---|---|---|---|
| 4,092,629 | 5/1978 | Siems et al. | 367/79 |
| 4,281,403 | 7/1981 | Siems et al. | 367/76 |
| 4,398,271 | 8/1983 | Cretin et al. | 367/20 |
| 4,464,739 | 8/1984 | Moorcroft | 367/20 |
| 4,528,650 | 7/1985 | Howlett et al. | 367/79 |

Primary Examiner—Thomas H. Tarcza
Assistant Examiner—Ian J. Lobo
Attorney, Agent, or Firm—Antonelli, Terry & Wands

[57] ABSTRACT

A two stage, decentralized device for transmitting seismic data information from seismic receivers of a seismic streamer to a central recorder on a ship, including a series of interconnected sections each having a plurality of seismic receivers distributed over it's length, seismic signal acquisition apparatus for digitizing and storing seismic signals coming from a group of seismic receivers to which a respective seismic signal acquisition apparatus is connected, central control and recording device on the ship and assembly of electronic modules each disposed in the vicinity of a seismic receiver and being capable of amplifying and filtering the seismic receiver signals.

11 Claims, 2 Drawing Sheets

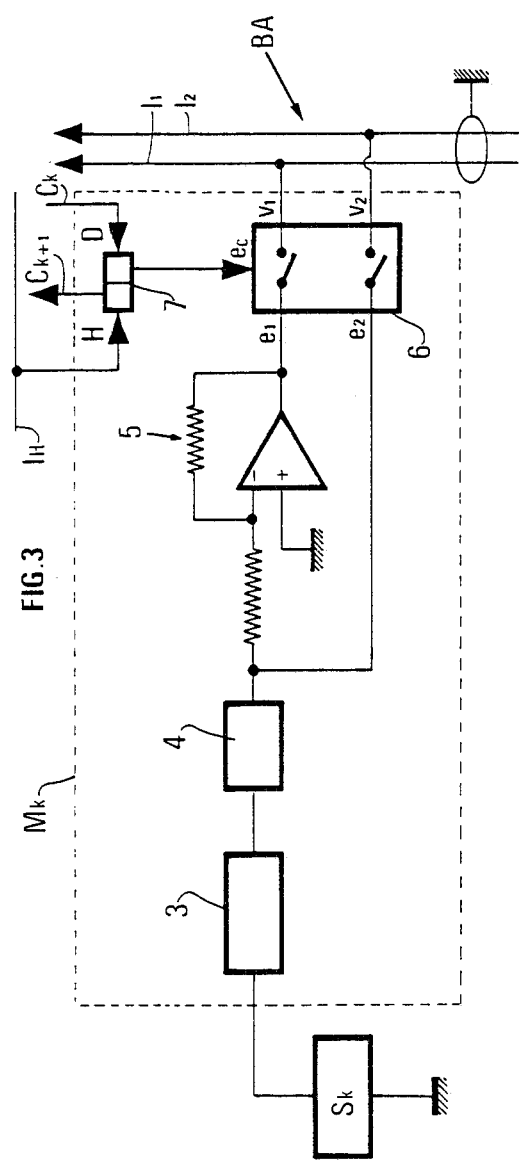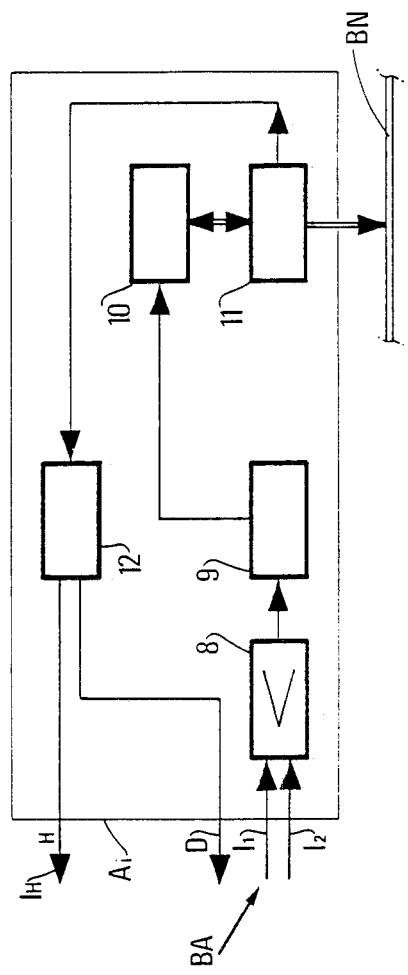

DEVICE USABLE FOR OFFSHORE SEISMIC PROSPECTION FOR RECEIVING SEISMIC SIGNALS AND TRANSMITTING THEM TO A CENTRAL CONTROL AND RECORDING SYSTEM

BACKGROUND OF THE INVENTION

1. Field of the Invention

The invention relates to a device for receiving seismic signals and transmitting them to a central control and recording system.

More particularly, the invention relates to a reception and transmission device in which the signals received by a plurality of sensors distributed inside the successive elements of a seismic streamer of great length, are gathered together previous to transmission thereof in electronic acquisition apparatus.

The signals received by each of the acquisition apparatus during the same transmission-reception cycle are sampled, digitized and recorded.

After each cycle and, controlled by the central system, the different acquisition apparatus transmit one after the other and sequentially the data which they have collected over one or more common transmission channels.

2. Description of the Prior Art

The electronic acquisition apparatus are disposed for example in rigid boxes inserted between the elements of the seismic streamer. Such a device is described for example in the U.S. Pat. No. 4,398,271.

The present tendancy in the geophysic field is the lengthening of the seismic streamers.

Increasing the total number of receivers both reduces the intertrace, that is to say the gap between two successive positions of the seismic profile restored (or restituted) by two adjacent recorded traces and also, by combining and processing the recorded signals, increases the sharpness of restoring of the recordings.

The number of inserted electronic apparatus and the density of integration of the components which are contained therein increase.

The fact that the boxes are thus made heavier has numerous drawbacks particularly in marine seismic prospection where the streamers are formed of a plurality of elements filled with a liquid having a density less than that of water, which provides them with a certain buoyancy.

The presence of relatively heavy boxes between the elements makes the distribution of the masses even more unequal, which results in increasing the drag and consequently the parasite flow noises which are superimposed on the useful signals.

The length of the connections between sensors and acquisition apparatus which may reach in some cases several tens of meters, considerably increases their sensitivity to parasite signals. This is particularly true in the case where acoustic receivers other than ceramic sensors are used in the streamers, particularly hydrophones of great length and of continuous structure, whose capacity is lower, for the same sensitivity.

The device of the invention overcomes the above mentioned drawbacks.

SUMMARY OF THE INVENTION

It includes a series of interconnected sections each having a plurality of seismic receivers distributed over its length, acquisition apparatus is disposed in at least a part of the inserted boxes for digitizing and storing each of the signals coming from at least one group of seismic receivers to which it is connected by connection means and digital transmission means for transfer to the acquisition apparatus of interrogation signals coming from a central control and recording device and transfer to this latter of the signals transmitted sequentially by the acquisition apparatus in response to the interrogation signals.

It further comprises an assembly of electronic modules, each one being disposed in one of said sections in the vicinity of a seismic receiver for amplifying and filtering the signals which it receives therefrom, the connection means connecting each group of receivers to the associated acquisition apparatus comprising a single transmission line, switches for connecting the outputs of the different electronic modules to the transmission line and synchronization means having a clock element disposed in each acquisition apparatus, a common connection line connecting each clock element to control elements disposed in the different electtronic modules, said control elements being interconnected with each other so as to generate in sequence control signals whose duration is equal to the repetition period of the clock, which control signals are applied respectively to the different switches.

With such decentralized structure in which the functions of preamplifying and filtering the seismic signals are carried out in the vicinity of each receiver, the acquisition apparatus only keep the digitizing, storing and multiplexed transmission functions.

Thus a better distribution of the functions is obtained and for an equal box volume, the acquisition capacities of each apparatus may be increased and made compatible with longer streamer sections or elements or such elements containing more receivers.

The dispersion of the electronic modules inside float sections, in the vicinity of the receivers, allows a better distribution of the masses to be obtained and consequently a better balance in the water, which reduces the parasite flow noises.

Since the electronic elements are better distributed, the risks of breakdowns related to the very high concentration are also reduced. It will be further noted that the seismic signals picked up by the receivers of the same streamer element travel along a common analog transmission cable.

The whole of the transmission lines contained in the same streamer element is consequently very much less than that generally observed in streamers. The risks of breakdowns related to the multiplicity of lines are then greatly reduced.

BRIEF DESCRIPTION OF THE DRAWINGS

Other features and advantages of the device will be clear from reading the description of one embodiment given by way of non limitative example, with reference to the accompanying drawings in which:

FIG. 3 shows the block diagram of an electronic module associated with any receiver of a streamer section and FIG. 4 shows the block diagram of a data acquisidevice disposed in one of the boxes inserted between the elements of a seismic streamer.

DESCRIPTION OF THE PREFERRED EMBODIMENTS

Figure 1:
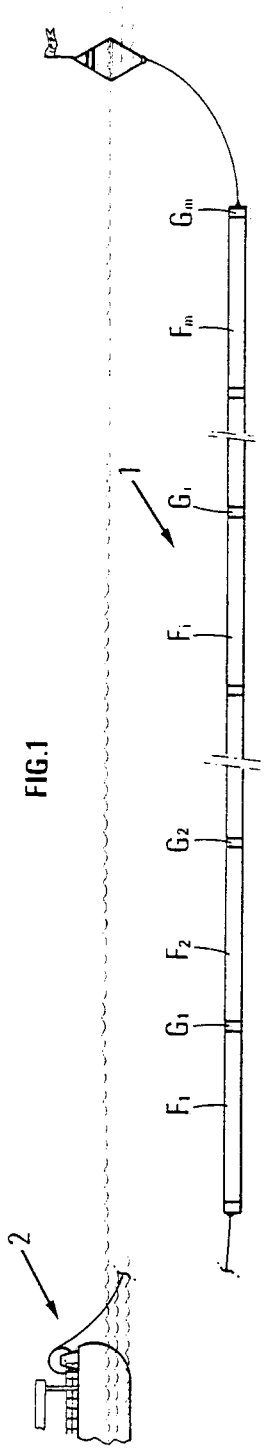
FIG. 1 shows schematically a seismic streamer towed immersed.

The seismic streamer shown schematically in FIG. 1 includes a flexible sheath 1 formed of a series of elements $F_1, F_2 \ldots F_i \ldots F_m$ each containing an assembly of seismic receivers, these elements being connected to each other by connection boxes $G_1, G_2 \ldots G_i \ldots G_m$ containing signal acquisition devices.

The seismic streamer is towed immersed by a ship 2 having a central control and recording system.

Such an assembly is described for example in the above mentioned U.S. Pat. No. 4,398,271.

Figure 2:
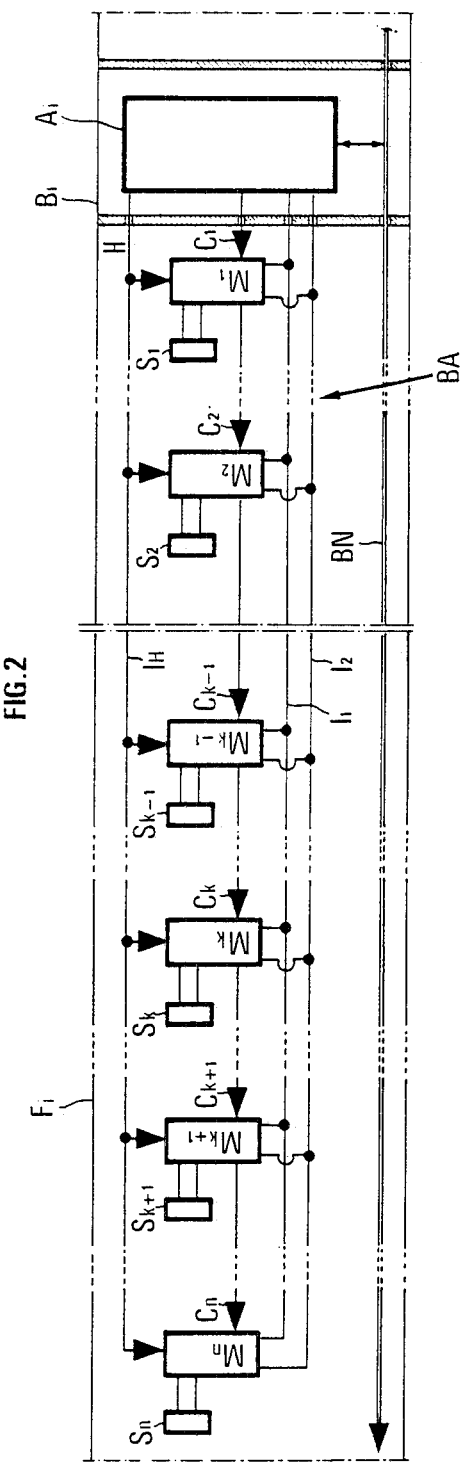
FIG. 2 shows very schematically a section of the seismic streamer and an end box containing a seismic data acquisition apparatus.

The streamer element $F_i$ shown schematically in FIG. 2 includes an assembly of seismic receivers $S_1, S_2 \ldots S_{k-1}, S_k, S_{k+1} \ldots S_n$ spaced apart at even intervals over the whole of its length and associated respectively with electronic modules $M_1, M_2 \ldots M_{k-1}, M_k, M_{k+1} \ldots M_n$.

Each of them comprises (FIG. 3) an antibiasing low pass filter 3 and a low cut off filter 4 interconnected in series. The signals delivered by the associated receiver $S_k$ are applied to the filters 3 and 4. The output of filter 4 is connected to the input of an inverter amplifier 5.

The outputs of filter 4 and amplifier 5 are applied to the input $e_1, e_2$ of a two-way electronic switch 6.

The outputs $v_1, v_2$ of switch 5 are connected respectively to two conducting wires $L_1$ and $L_2$ of a shielded twin wire line forming an analog bus $B_A$.

The control input $e_c$ of the electronic switch 6 is connected to a first output of a bistable flip flop 7. A first input thereof is connected to a line $L_H$ running along the whole of the streamer section $F_k$ which conveys a clock signal H. A second input of the bistable flip flop 7 is connected to a line section $C_k$ coming from the preceding electronic module $M_{k-1}$.

The complementary output of flip flop 7 is connected to the second input of the identical flip flop contained in the following electronic module $M_{k+1}$.

The application to lines $L_1, L_2$ of the analog bus of two signals in phase opposite, one taken from the output of filter 4 the other from the output of the inverter amplifier 5, as is well known, allows the common mode signals to be rejected and in particular the parasite signals.

A multiconductor cable or digital bus $B_A$ connected at a first end to the central control and recording device installed on ship 2, is disposed all along the seismic streamer 1. It is used for transferring digitized control signals to the different acquisition apparatus of the streamer from the central device and for transferring back thereto the seismic data acquired after each recording cycle.

The analog bus $B_A$ (FIG. 2) is connected, at one end of the streamer element $F_i$, to an acquisition apparatus $A_i$.

The signals present on bus $B_A$ are applied to the input of the variable gain amplifier 8 (FIG. 4). Such a variable gain seismic amplifier is described in the French patent Nos. 2,469.040 or 2,487,603, for example.

The amplified signals from the amplifier 8 are digitized in an analog-digital converter 9 then stored in a storage member 10.

The acquisition apparatus $A_i$ also includes a decoding and switching assembly 11 adapted for decoding the address and control signals flowing over the digital bus $B_N$.

When the acquisition apparatus $A_i$ is concerned, the assembly 11 connects the storage member 10 to the cable $B_N$ so that the digitized signals which have been connected are transferred to the central recording system on the ship.

The decoding and switching assemblies also are kept for detecting and restoring synchronization signals coming from the central system over the digital bus $B_N$. These synchronization signals are applied to a clock element 12 adapted for creating a clock signal H and for transferring it to the line $L_H$ (FIG. 2), as well as a signal D of the same frequency as the clock signal H and offset with respect thereto, this signal D being transmitted over the line section $C_1$ to the first module $M_1$.

The device operates in the following way:

The seismic signals picked up by the receivers $S_1$ to $S_n$ of each streamer element, in response to the waves transmitted by seismic source towed by the ship and reflected back by the discontinuities of the subsoil, are amplified and filtered in the associated electronic modules ($M_1-M_n$).

A pulse D transmitted over the line section $C_1$ by the clock element 12 of each acquisition device (FIG. 4) actuates the flip flop 7 of the first module $M_1$ (FIGS. 2 and 3). This causes closure of switch 6 and application of the seismic signal picked up by the receiver $S_1$ to the analog bus $B_A$.

The signal is transferred to the associated acquisition apparatus until a clock signal H arrives over line $L_H$. Reset of flip flops 7 which results therefrom causes switch 6 to open and creates a pulse which is transmitted over the line section $C_2$ to the flip flop 7 of the following electronic module $M_2$. Consequently, it is the signals coming from module $M_2$ which are in their turn transmitted over the analog bus $B_A$ and transferred to the acquisition device.

Gradually, by such tripping in cascade, all the electronic modules are connected in turn to the analog bus $B_A$ and transfer a sample of the signal picked up by the associated receivers. The whole of the flip flops 7 of the different modules forms a distributed element shift register.

The application of a new pulse D to the line section $C_1$ triggers off a new sequence of transferring a sample successively from all the electronic modules to the associated acquisition apparatus.

After the transmission-reception cycle, each of the acquisition devices is connected under control to the digital bus $B_N$ and transfers to the central system on board the ship all the sampled signals which it has stored.

What is claimed is:

1. In a reception device of great length for offshore seismic prospection including a series of sections interconnected with each other by means of boxes, each of the sections including a plurality of seismic signal receivers distributed over the whole of the section length, seismic signal acquisition apparatuses disposed in at least a portion of the boxes for digitizing and storing seismic signals coming from a group of seismic receivers to which a respective acquisition apparatus is connected; a central control and recording device, digital transmission means for transferring interrogation control signals from the central control device to the acquisition apparatuses and for transferring in sequence signals from the acquisition apparatuses; and assembly of electronic modules, each of which is disposed in the vicinity of a seismic receiver and being capable of amplifying and filtering the seismic receiver signals; means connecting each group of seismic receivers to an associated acquisition apparatus including a single transmission line; means including a switch associated with each electronic module for sequentially connecting the outputs of the different electronic modules to the transmission line; and synchronization means including a clock-element disposed in each acquisition apparatus, means including a common connection line connecting each clock element to control elements disposed in the different electronic modules, said control elements being interconnected with each other so as to generate in sequence control signals whose duration is equal to the repetition period of the clock, and the control element of each electronic module is a bistable flip flop, a first input of which is connected to the connection line to the clock element, a second input of which is connected to a first output of a bistable flip flop in another electronic module and a second output of which is connected to the corresponding switch, each of the successive pulses transmitted over the connection line resulting in opening the switch of one electronic module and in closing the switch of another electronic module, the time intervals for connecting the different electronic modules to each connection line being equal and offset with respect to each other.

2. The device as claimed in claim 1, wherein each transmission line is a twin wire line and each electronic module includes a two way switch whose outputs are connected respectively to the two switches of the corresponding transmission line and an inverter amplifier whose input and output are connected respectively to the two inputs of the switch, 3. The device as claimed in claim 1, wherein each acquisition apparatus has means for amplifying the signals transmitted successively by the different associated electronic modules, means for digitizing the amplified signals and means for storing the digitized signals.

4. A two-stage signal transmission system for transmission to a central control and recording apparatus on a vehicle, the transmission being of seismic signals picked up by an assembly of seismic receivers distributed along a reception device of great length towed by said vehicle;

said reception device comprising a series of sections interconnected with each other by boxes;

data acquisition apparatus within at least some of said boxes including means for digitizing and storing seismic data signals emanating from the receivers in an adjacent section of said reception device;

first stage signal transmission means including in each section of said reception device:

an assembly of electronic modules each being disposed close to a seismic receiver for amplifying and filtering analog signals received from the receiver;

each of said electronic modules further including a control element and connection means for connecting each group of electronic modules to the associated data acquisition apparatus through a single seismic data transmission line;

switch means for connecting the analog outputs of the different electronic modules to said transmission line;

synchronization means including a clock-element disposed within each acquisition apparatus, a common first connection line connecting said clock element to the control elements disposed in the different electronic modules, means including a series of second connection lines extending between control elements of adjacent electronic modules for interconnection with each other so as to generate in sequence in each electronic module a control signal having a duration that is equal to the repetition rate of the clock; and means responsive to said control signal for actuating the switch means in the associated electronic module whereby data signals from said seismic receivers of each section of said reception device are sequentially transmitted via said single transmission line to the associated data acquisition apparatus for digitizing and storage; and a second stage transmission means including control signal transmission means extending between said central control and recording apparatus and each of said data acquisition apparatuses, said second stage transmission means including a control signal transmission means for transferring acquisition apparatus control signals to the data acquisition apparatuses from said central control and a digital data transmission means for transferring stored seismic data signals from the acquisition apparatuses to said central control and recording apparatus.

5. The two-stage signal transmission system as claimed in claim 4 wherein said acquisition apparatus within certain of said boxes further comprises means for amplifying signals received from the different associated electronic modules and thereafter outputting said signals to said digitizing means and said storage means where such signals are stored as seismic digitized data signals for subsequent transfer by the second stage transmission means from the towed reception device to the central recording apparatus on said vehicle.

6. A two-stage transmission device for transmission to a central control and recording system on a vehicle of seismic signal picked up by an assembly of seismic receivers distributed along a reception device of great length towed by said vehicle, said reception device comprising a series of sections interconnected with each other by boxes, acquisition apparatus within at least certain of said boxes for digitizing and storing seismic signals emanating from at least one adjacent section of said reception device, said two stage transmission device comprising:

a first stage transmission means including in each section of said reception device an assembly of electronic modules, each of which being disposed close to each seismic reciever for amplifying and filtering signals received therefrom, connection means for connecting each groups of seismic receivers to the associated acquisition apparatus including a single transmission line, switches for connecting the outputs of the different electronic modules, to the transmission line, and synchronization means including a clock-element disposed in each acquisition apparatus, a common connection line, connecting each clock element to control elements disposed in the different electronic modules, said control elements being interconnected with each other so as to generate in sequence control signals whose duration is equal to the repetition period of the clock, which control signals are applied respectively to the different switches, whereby signals from said seismic receivers of each section of said reception device are sequentially transmitted to the associated acquisition apparatus, the control element of each electronic module being a bistable flip flop provided with a first and a second output, with a first input connected to the connection line to the clock element and with a second input connected to the first output of a bistable flip flop in another electronic module and said output of which is connected to the corresponding switch, each of the successive pulses transmitted over said connection line resulting in opening said switch of one electronic module and in closing the switch in another electronic module, the time intervals for connecting the different electronic modules to each connection line being equal and offset with respect to each other, and a second stage transmission means including connection means and digital transmission means for transferring the acquisition apparatus control signals from said central control and recording system and for transferring thereto the signals transmitted sequentially by the acquisition apparatus in response to said control signals.

7. The device as claimed in claim 6, wherein each transmission line is a twin wire line and each of said switches is a two way switch provided with outputs connected respectively to the two wires of said transmission line and with two inputs, each electronic module comprising on inverting amplifier and filter means for filtering signals from each said seismic receivers, a first of said inputs of said two way switch being connected directly to said filter means and a second one of said inputs thereof to said filter means through said inverting amplifier.

8. The device as claimed in claim 6, wherein each acquisition apparatus comprises means for amplifying signals transmitted successively by the different associated electronic modules, means for digitizing the amplified signals and means for storing the digitized signals.

9. In a seismic data reception device of great length for offshore marine seismic prospection including a series of sections interconnected with each other by means of boxes, a plurality of seismic signal receivers distributed along the length of each section, a plurality of electronic modules disposed along a section length and each being in the vicinity of a seismic receiver, a single transmission line physically connected to each of the electronic modules of the section length and terminating in a seismic data acquisition apparatus located in a box to which said section length is connected;

sequencing means associated with each of the electronic modules for sequentially connecting a signal output from the different electronic modules to the transmission line to supply an input signal to said acquisition apparatus;

said acquisition apparatus including a clock which controls the sequencing means, means for digitizing the seismic signals received from said transmission line and means for storing said digitized seismic signals;

a central control and recording device connected to each of said acquisition apparatuses;

means for transferring interrogation control signals from the central control device sequentially to each of the acquisition apparatuses and means responsive to one of said control signals for effecting the transfer to said central recording device digital signals then in the memory of the interrogated acquisition apparatus.

10. The reception device of claim 9 further including means responsive to a central control signal in each acquisition apparatus for actuating the sequencing means associated with each electronic module to thereby multiplex output signals from each electronic module to its associated acquisition apparatus.

11. The reception device of claim 10 further including a common connection line connecting a signal from said clock to each electronic module connected to supply signals to said acquisition apparatus and a further connection line which extends between each electronic module and its adjacent module for receiving a control signal from the preceding electronic module when it is active and for transmitting a control signal to the next succeeding electronic module upon reception of the next clock signal.

* * * * *